(12) United States Patent
Matsushita et al.

(10) Patent No.: US 12,470,823 B2
(45) Date of Patent: Nov. 11, 2025

(54) SHAKE CORRECTION DEVICE AND IMAGING APPARATUS

(71) Applicant: FUJIFILM Corporation, Tokyo (JP)

(72) Inventors: Shuhei Matsushita, Saitama (JP); Yuta Abe, Saitama (JP); Takuro Abe, Saitama (JP); Kouhei Awazu, Saitama (JP); Atsushi Matsushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 90 days.

(21) Appl. No.: 18/586,587

(22) Filed: Feb. 26, 2024

(65) Prior Publication Data

US 2024/0292103 A1 Aug. 29, 2024

(30) Foreign Application Priority Data

Feb. 28, 2023 (JP) ................................ 2023-030448

(51) Int. Cl.
*H04N 23/68* (2023.01)
*H04N 23/54* (2023.01)
*H04N 23/55* (2023.01)

(52) U.S. Cl.
CPC .......... *H04N 23/687* (2023.01); *H04N 23/54* (2023.01); *H04N 23/55* (2023.01)

(58) Field of Classification Search
CPC ...... H04N 23/54; H04N 23/55; H04N 23/685; H04N 23/687
See application file for complete search history.

(56) References Cited

U.S. PATENT DOCUMENTS

2020/0404183 A1* 12/2020 Kimura ................. H04N 25/61
2021/0160403 A1   5/2021 Kamiya

FOREIGN PATENT DOCUMENTS

JP           2021085961        6/2021

* cited by examiner

*Primary Examiner* — Daniel M Pasiewicz
(74) *Attorney, Agent, or Firm* — JCIPRNET

(57) ABSTRACT

A shake correction device according to an aspect of the present invention includes: an imaging element; a fixed unit that includes a magnet member and a yoke member; a movable unit that includes a holding frame holding the imaging element and a coil member, in which the holding frame is supported to be movable within a plane intersecting an optical axis of the imaging element; and a ball that is disposed between the fixed unit and the movable unit, in which the yoke member includes a first yoke to which the magnet member is provided and a second yoke that is disposed to be spaced apart from the first yoke, the first yoke has a first ball receiving surface that is in contact with the ball, and the first ball receiving surface is a partial region of the first yoke and is a protruding portion toward a movable unit side.

14 Claims, 10 Drawing Sheets

SHAKE CORRECTION DEVICE AND IMAGING APPARATUS

CROSS-REFERENCE TO RELATED APPLICATION

The present application claims priority under 35 U.S.C § 119(a) to Japanese Patent Application No. 2023-030448 filed on Feb. 28, 2023, which is hereby expressly incorporated by reference, in its entirety, into the present application.

BACKGROUND OF THE INVENTION

1. Field of the Invention

The present invention relates to a shake correction device that is used to perform shake correction, and an imaging apparatus comprising the shake correction device.

2. Description of the Related Art

Regarding a technology for performing shake correction of an imaging apparatus, for example, JP2021-85961A discloses a camera shake correction mechanism comprising a fixed unit, a movable unit, a yoke, a coil, and the like.

SUMMARY OF THE INVENTION

In an in-body image stabilization (BIS, sometimes referred to as *IBIS*) of a digital camera, a movable unit that holds an imaging element moves in translation or rotates in an in-plane direction perpendicular to an optical axis, so that camera shake can be corrected. The movable unit moves in the in-plane direction while being biased to the fixed unit so as not to move in translation in an optical axis direction. The movable unit and the fixed unit are in contact with each other via a ball in the optical axis direction, and the movable unit is supported by three balls. In a case where the movable unit moves in the in-plane direction, the movable unit moves smoothly as the ball rolls. Since the ball repeatedly rolls each time the movable unit moves, the ball receiving surface is required to have an abrasion resistance. In addition, since the ball receiving surface supports the movable unit, an external force is applied due to a drop impact or vibration. However, in a case where dents are formed on the ball receiving surface, it is difficult to perform position control of the movable unit with high accuracy. Therefore, the ball receiving surface is also required to have a high surface hardness. Since the ball receiving surface has an abrasion resistance and a high hardness, the ball receiving surface has been designed using a SUS301 material (SUS: Steel Use Stainless, a kind of stainless steel) or the like so far.

A VCM actuator is used for driving the movable unit. Since a VCM configuration in which a coil is disposed in the movable unit and a magnet and a yoke are disposed in the fixed unit is generally used to design a magnetic circuit that exhibits high VCM performance, the yoke has been designed using a magnetic material having a high saturation magnetic flux density such as a steel plate cold commercial (SPCC) material so far.

For this reason, in a BIS fixing portion of the related art, the ball receiving surface and the yoke are divided into two components and are designed to satisfy respective performance requirements. This is because the SUS301 material that has been used so far for the ball receiving surface is austenite stainless steel and does not function as a yoke because it is not a magnetic material, and because the SPCC material that has been used so far for the yoke has a surface hardness of about 200 Hv and does not function as a ball receiving surface because there is a concern that dents may be formed.

In view of such circumstances, the inventors of the present application conducted extensive studies and obtained the idea of the present invention described below. An embodiment according to a technology of the present disclosure provides a shake correction device that moves a holding member holding an imaging element to correct a shake, and an imaging apparatus comprising such a shake correction device.

A shake correction device according to a first aspect of the present invention includes: an imaging element; a fixed unit that includes a magnet member and a yoke member; a movable unit that includes a holding frame holding the imaging element and a coil member, in which the holding frame is supported to be movable within a plane intersecting an optical axis of the imaging element; and a ball that is disposed between the fixed unit and the movable unit, in which the yoke member includes a first yoke to which the magnet member is provided and a second yoke that is disposed to be spaced apart from the first yoke, the first yoke has a first ball receiving surface that is in contact with the ball, and the first ball receiving surface is a partial region of the first yoke and is a protruding portion toward a movable unit side.

According to a second aspect of the present invention, in the shake correction device according to the first aspect, the first ball receiving surface is a surface formed by machining the protruding portion. Here, the machining is to process a material into a target shape by using a machine, and there are a plurality of types such as cutting and press-working.

According to a third aspect, in the shake correction device according to the first or second aspect, the protruding portion is a protruding portion formed by press-working a member constituting the first yoke.

According to a fourth aspect, in the shake correction device according to any one of the first to third aspects, the first yoke is disposed on a subject side with respect to the imaging element, and the movable unit is biased to the first yoke.

According to a fifth aspect, in the shake correction device according to the fourth aspect, a biasing member that biases the movable unit to a first yoke side is further provided.

According to a sixth aspect, in the shake correction device according to any one of the first to fifth aspects, the first yoke is formed of a material having a saturation magnetic flux density of 0.6 T or more and a surface hardness of 290 Hv or more.

According to a seventh aspect, in the shake correction device according to the sixth aspect, the first yoke is formed of a material having a surface hardness of 350 Hv or more.

According to an eighth aspect, in the shake correction device according to any one of the first to seventh aspects, a ball holding portion that holds the ball is formed in the movable unit, and the ball held by the ball holding portion rolls on the first ball receiving surface.

An imaging apparatus according to a ninth aspect of the present invention comprises: the shake correction device according to any one of the first to eighth aspects; and an optical system that forms an optical image of a subject on the imaging element, in which the movable unit corrects an image shake by moving within a plane intersecting an optical axis of the imaging element.

According to a tenth aspect, in the imaging apparatus according to the ninth aspect, a surface of the first yoke on a subject side is a mounting surface, and the shake correction device is attached to a main body of the imaging apparatus via the mounting surface.

According to an eleventh aspect, in the imaging apparatus according to the tenth aspect, the imaging element and the main body are in contact with each other via the movable unit, a second ball receiving surface formed on the movable unit, the ball, and the first yoke.

According to a twelfth aspect, in the imaging apparatus according to any one of the ninth to eleventh aspects, the movable unit includes an optical member disposed in a direction from an imaging surface of the imaging element toward the first yoke, and the optical member moves away from a rearmost lens in a case where an external force is applied in a direction opposite to a direction in which the movable unit is biased.

According to a thirteenth aspect, in the imaging apparatus according to the twelfth aspect, other optical components are not interposed between the optical member and the rearmost lens in a direction of the optical axis.

According to a fourteenth aspect, in the imaging apparatus according to any one of the ninth to thirteenth aspects, the imaging apparatus is a lens-integrated imaging apparatus.

DESCRIPTION OF THE PREFERRED EMBODIMENTS

Hereinafter, preferred embodiments of a shake correction device and an imaging apparatus according to the present invention will be described with reference to the accompanying drawings. In the following drawings, in order to make the description easier to understand, depending on the drawings, some members may not be shown, and/or members may be shown with changes in color, line types, or the like.

Configuration of Imaging Apparatus

Figure 1:
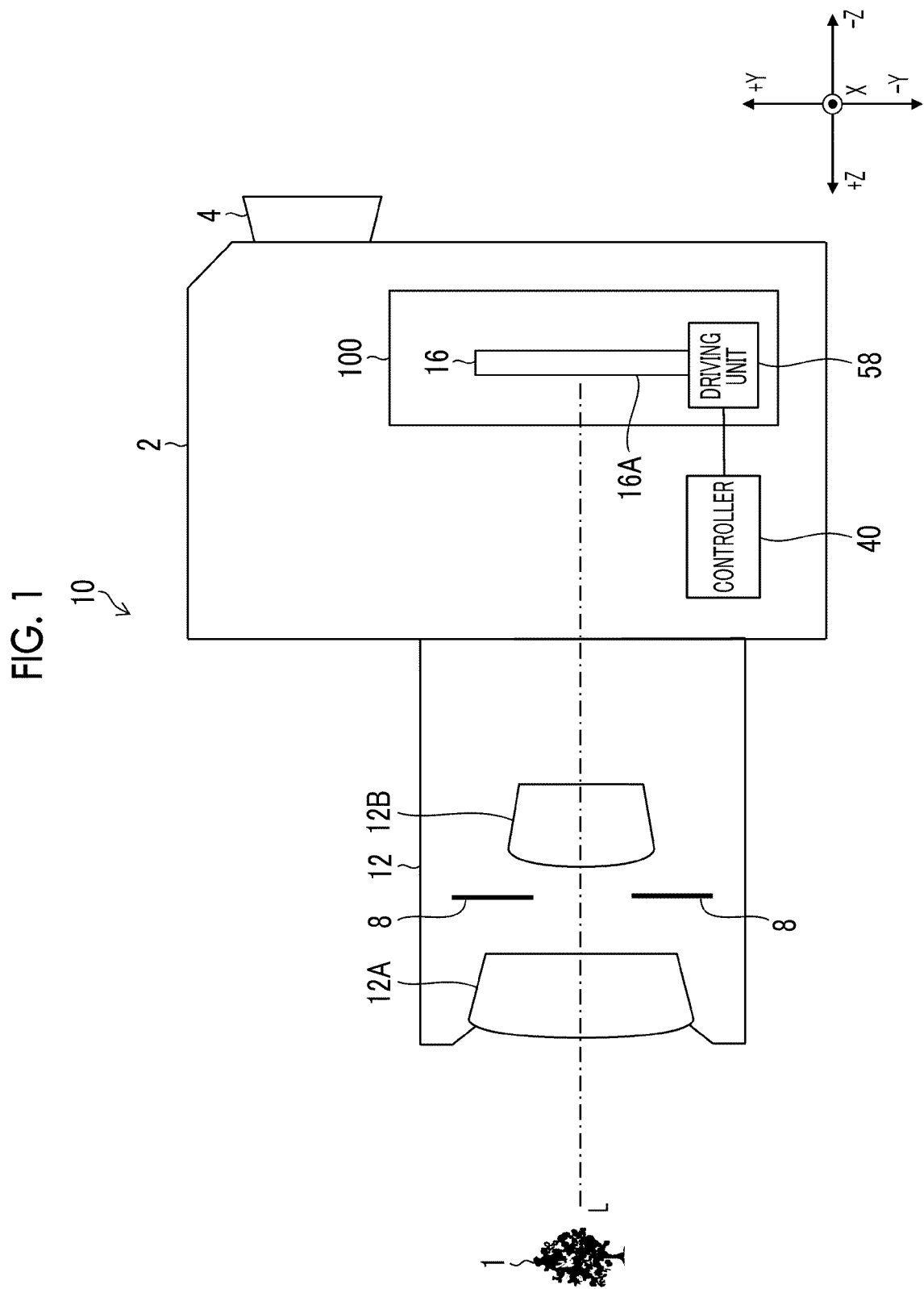
FIG. 1 is a view showing a schematic configuration of an imaging apparatus equipped with a shake correction device.

First, an imaging apparatus equipped with a shake correction device will be described. FIG. 1 is a view showing a schematic configuration of the imaging apparatus equipped with the shake correction device.

An imaging apparatus 10 (imaging apparatus) is a lens-integrated camera, and a lens device 12 (optical system) is mounted on an imaging apparatus main body 2. The lens device 12 comprises a stop 8 (optical system), a lens group 12A (optical system), and a lens group 12B (optical system), and has an optical axis L (optical axis). The lens device 12 forms an optical image of a subject 1 (subject) on an imaging element 16. The imaging apparatus main body 2 comprises an eyepiece portion 4, and an imager can place his/her eye on the eyepiece portion 4 to visually recognize the subject 1.

On the imaging element 16, an imaging surface 16A (imaging surface; light-receiving surface) is disposed along a plane (X-Y plane) formed by two directions (X direction and Y direction) perpendicular to the optical axis L (Z direction). The imaging element 16 is held by a shake correction device 100 (shake correction device). Further, as will be described in detail later, a shake correction function is realized by a controller 40 controlling a driving unit 58 included in the shake correction device 100.

Figure 2:
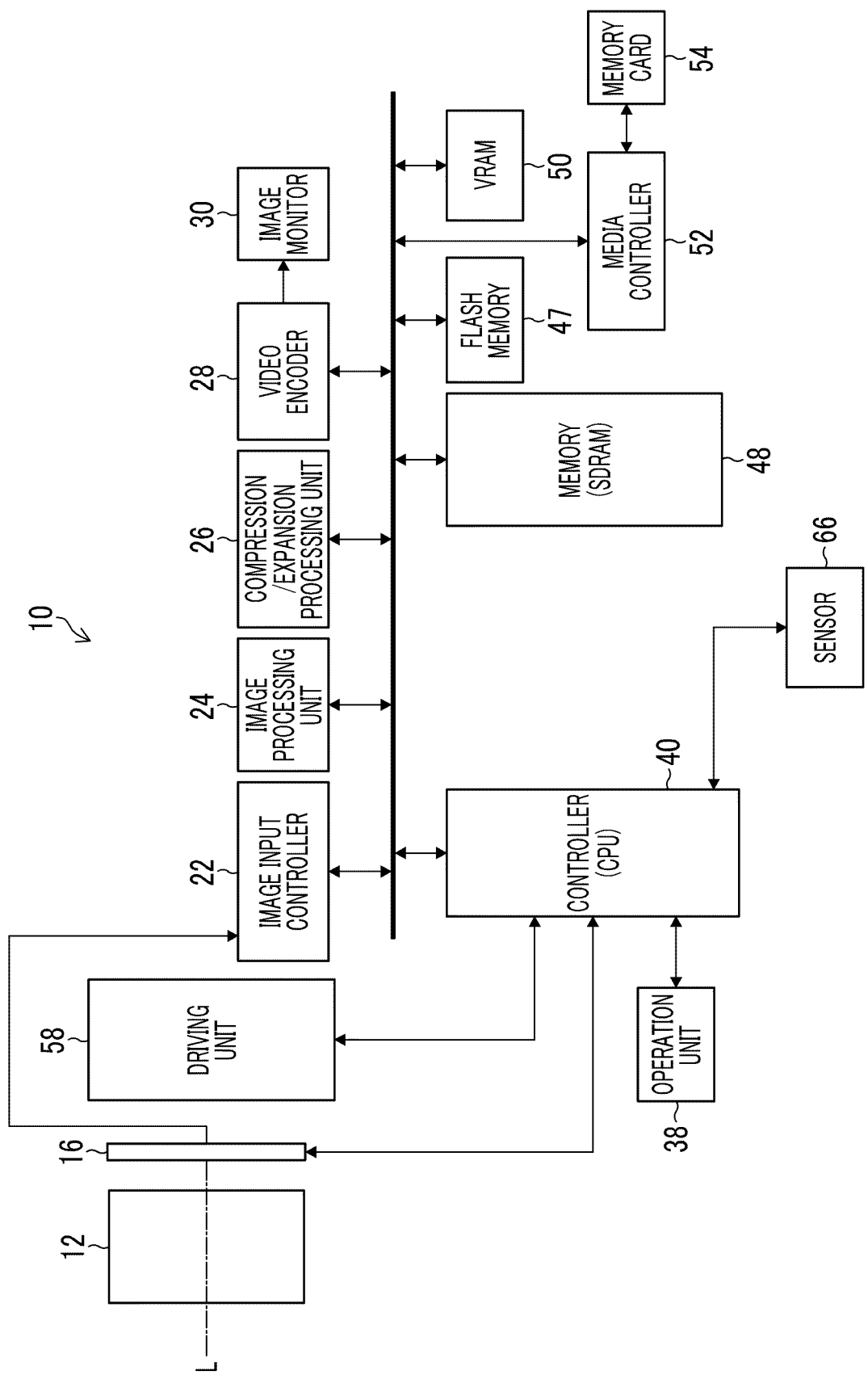
FIG. 2 is a block diagram showing an aspect of an internal configuration of the imaging apparatus.

FIG. 2 is a block diagram showing an aspect of an internal configuration of the imaging apparatus 10. The imaging apparatus 10 records a captured image in a memory card 54, and an operation of the entire apparatus is comprehensively controlled by the controller 40 comprising a processor such as a central processing unit (CPU).

The imaging apparatus 10 is provided with an operation unit 38, such as a shutter button, a power/mode switch, a mode dial, and a cross operation button. A signal (command) from the operation unit 38 is input to the controller 40, and the controller 40 controls each circuit of the imaging apparatus 10 based on the input signal to perform drive control of the imaging element 16, lens drive control, stop drive control, imaging operation control, image processing control, recording/reproduction control of image data, display control of an image monitor 30, and the like.

A luminous flux that has passed through the lens device 12 is imaged on the imaging element 16 (imaging element) which is a complementary metal-oxide semiconductor (CMOS) type color image sensor. The imaging element 16 is not limited to the CMOS type, and another type of image sensor, such as a charge coupled device (CCD) type or an organic imaging element, may be used.

In the imaging element 16, a large number of light-receiving elements (photodiodes) are two-dimensionally arranged, and a subject image formed on the light-receiving surface of each light-receiving element is converted (photoelectrically converted) into a signal voltage (or charge) of an amount corresponding to an amount of incidence rays, and is converted into a digital signal via an analog/digital (A/D) converter in the imaging element 16 to be output.

An image signal (image data) read from the imaging element 16 in a case of capturing a motion picture or a still picture is temporarily stored in a memory 48 (for example, a synchronous dynamic random access memory (SDRAM)) via an image input controller 22.

Further, a flash memory 47 stores various parameters and tables used for a camera control program, image processing, and the like.

A sensor 66 is a camera shake sensor and detects posture information and posture change information of the imaging apparatus 10. The sensor 66 is configured of, for example, a gyro sensor. The sensor 66 is configured of, for example, two gyro sensors to detect a camera shake amount in a vertical direction (+Y, −Y direction) and a camera shake amount in a horizontal direction (+X, −X direction), and the detected camera shake amount (angular velocity) is input to the controller 40. The controller 40 performs shake correction by controlling the driving unit 58 to move the imaging element 16 such that the movement of the subject image corresponding to the camera shake is canceled. A gyro sensor for detecting a camera shake amount in a rotation direction (for example, around a Z axis) may be provided in the sensor 66, and the shake correction may be performed so as to cancel the camera shake in the rotation direction.

The driving unit 58 (driving mechanism) is controlled by the controller 40. The driving unit 58 is composed of a voice coil motor (VCM) or the like described below.

An image processing unit 24 reads unprocessed image data that is acquired via the image input controller 22 in case of capturing a motion picture or a still picture and temporarily stored in the memory 48. The image processing unit 24 performs offset processing, pixel interpolation processing (interpolation processing for a phase difference detecting pixel, a defective pixel, and the like), white balance correction, gain control processing including sensitivity correction, gamma-correction processing, synchronization processing (also called "demosaicing"), brightness and color difference signal generation processing, edge enhancement processing, color correction, and the like on the read image data. The image data that is processed by the image processing unit 24 and is processed as a live view image is input to a video random access memory (VRAM) 50.

The image data read from the VRAM 50 is encoded by a video encoder 28 and output to the image monitor 30 provided on a rear surface of the camera. Accordingly, the live view image showing the subject image is displayed on the image monitor 30.

The image data that is processed by the image processing unit 24 and is processed as a still picture or motion picture for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a still picture or a motion picture. The compressed image data is recorded in the memory card 54 via a media controller 52.

Further, the compression/expansion processing unit 26 performs expansion processing on the compressed image data obtained from the memory card 54 via the media controller 52 in a playback mode. The media controller 52 records and reads the compressed image data to and from the memory card 54.

In the above embodiment, a hardware structure of a processing unit such as the controller 40 that executes various kinds of processing includes various processors to be described below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured of one of these various processors, or may be configured of two or more same type or different types of processors (for example, a plurality of FPGAs or a combination of the CPU and the FPGA). In addition, a plurality of processing units may be configured of one processor. As an example of configuring the plurality of processing units by one processor, first, there is a form in which one processor is configured of a combination of one or more CPUs and software, as typified by a computer such as a client or a server, and the one processor functions as the plurality of processing units. Second, there is a form in which a processor that realizes functions of an entire system including a plurality of processing units with one integrated circuit (IC) chip is used, as typified by a system on chip (SoC) or the like. As described above, the various processing units are configured using one or more of the above various processors as a hardware structure.

Furthermore, the hardware structure of those various processors is more specifically an electric circuit (circuitry) in which circuit elements such as semiconductor elements are combined.

Outline of Shake Correction Device

Next, an outline of the shake correction device 100 will be described. In the following description, a "front surface" is a surface seen from a +Z side (subject side), and a "rear surface" is a surface seen from a −Z side (imaging surface side, imager side).

Figure 3:
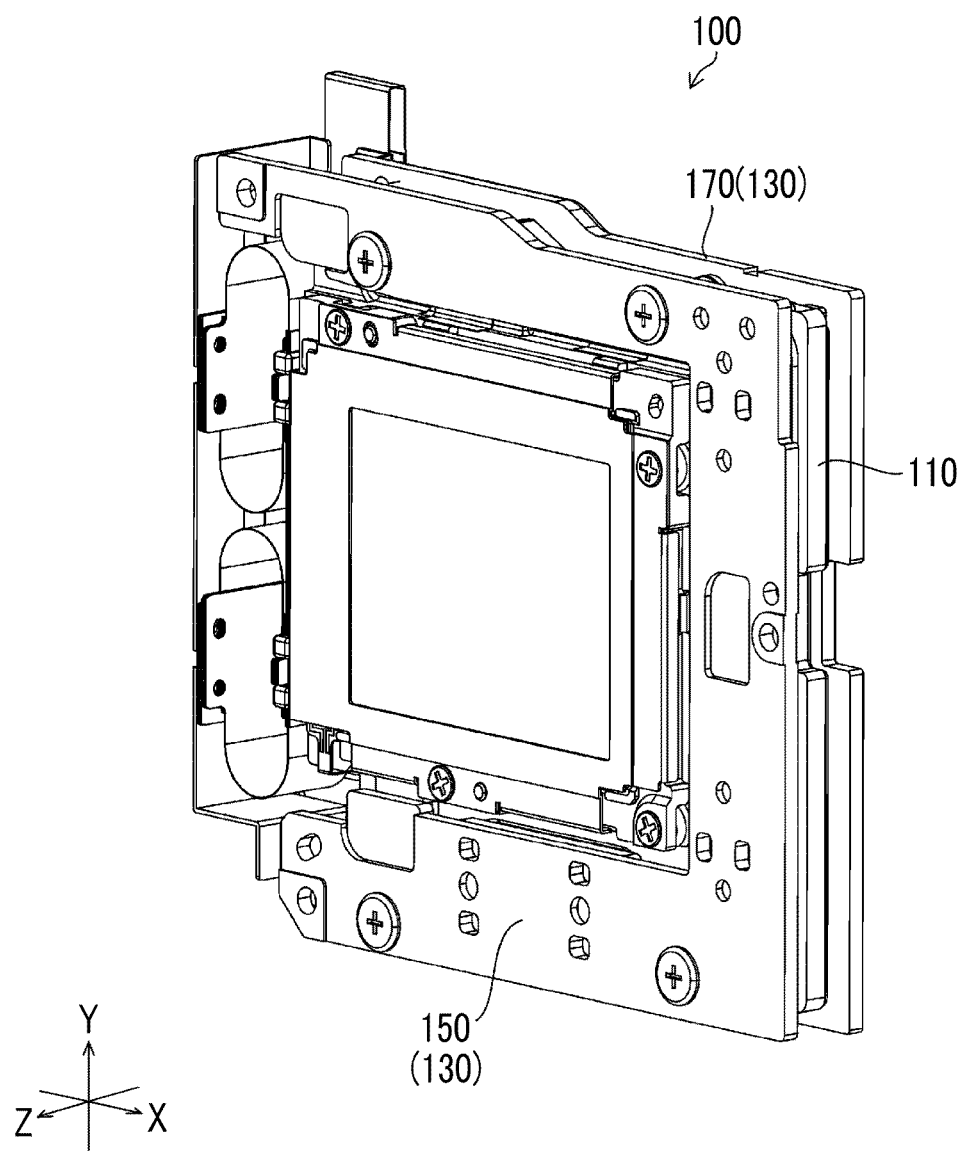
FIG. 3 is a front perspective view showing a configuration of a shake correction device.

FIG. 3 is a front perspective view showing a configuration of the shake correction device. As shown in FIG. 3, the shake correction device 100 is mainly composed of a movable unit 110 (movable unit) by which the imaging element 16 (imaging element) is held and a fixed unit 130 (fixed unit) fixed to the imaging apparatus main body 2. The fixed unit 130 comprises a drive yoke 150 (yoke member; first yoke) and a counter yoke 170 (yoke member; second yoke). The drive yoke 150 and the counter yoke 170 are disposed to be spaced from each other and are connected to each other by a shaft (not shown). The movable unit 110 is biased toward the drive yoke 150 side by magnetic springs 162, 164, and 166 (biasing members), which will be described below.

Structure of Fixed Unit

Figure 4:
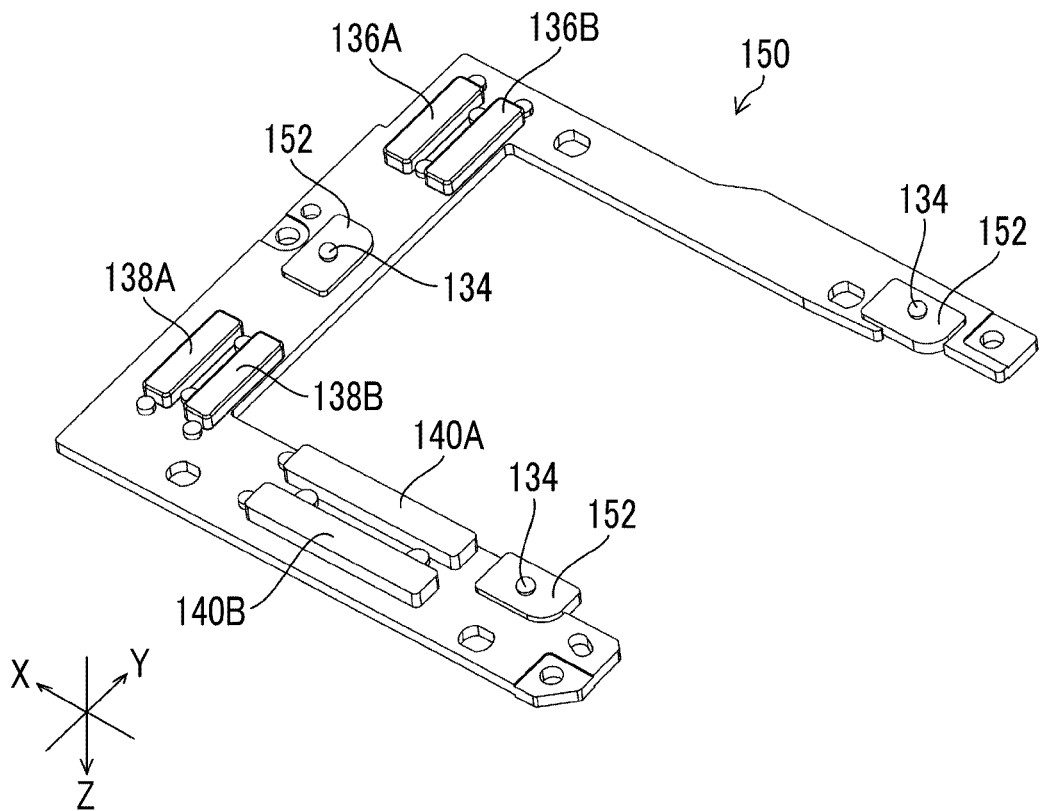
FIG. 4 is a perspective view showing a state in which a drive yoke is viewed from an imaging surface side (−Z side).

FIG. 4 is a view showing a state in which the drive yoke 150 (yoke member; first yoke) is viewed from the imaging surface side (−Z side). The drive yoke 150 has a shape in which a −X side is open, and a flexible printed circuit (FPC) or the like is disposed on the −X side.

In addition, a magnet member is disposed on the drive yoke 150. Specifically, as shown in FIG. 4, magnets 136A and 136B (magnet members) are disposed on a (+X, +Y) side, magnets 138A and 138B (magnet members) are disposed on a (+X, −Y) side, and magnets 140A and 140B (magnet members) are disposed on the −X side with respect to these magnets. These magnets and a coil (coil member; see FIGS. 7 and 11) provided in the movable unit 110 constitute a voice coil motor (VCM). For example, N poles of the magnets 136A, 138A, and 140A can be disposed on an upper side (−Z side) in FIG. 4, and conversely, S poles of the magnets 136B, 138B, and 140B can be disposed on the upper side. However, directions of the magnetic poles of the magnets may be opposite thereto.

First Ball Receiving Surface

The drive yoke 150 is provided with first ball receiving surfaces 152 (first ball receiving surfaces) at three locations. The first ball receiving surface 152 is a partial region of the drive yoke 150 (first yoke) and is a protruding portion toward the movable unit side. The first ball receiving surface 152 can be formed integrally with the drive yoke 150, for example, by press-working a member constituting the first yoke. The press-working is, for example, half punching (referring to processing in which a height of about half a thickness of the member is protruded without completely penetrating the member of the drive yoke 150; sometimes referred to as half blanking, half penetration, punching, doweling, or the like). However, the height of the protruding portion is not limited to half the thickness of the member. Further, the first ball receiving surface 152 is preferably a surface formed by machining the protruding portion formed by half punching. As the machining, for example, processing to increase flatness can be performed by polishing. As described above, since the first ball receiving surface 152 is a partial region of the drive yoke 150, it is not necessary to perform machining on the entire drive yoke 150, and it is possible to reduce a cost of the shake correction device 100.

A ball 134 (ball) is in contact with the first ball receiving surface 152 formed as described above, and the ball 134 rolls on the first ball receiving surface 152. That is, the movable unit 110 holding the imaging element 16 is supported to be movable in a plane intersecting the optical axis L, and it is possible to correct an image shake by the movement of the movable unit 110. Note that "the plane intersecting the optical axis L" is preferably a plane perpendicular to the optical axis L.

Figure 5:
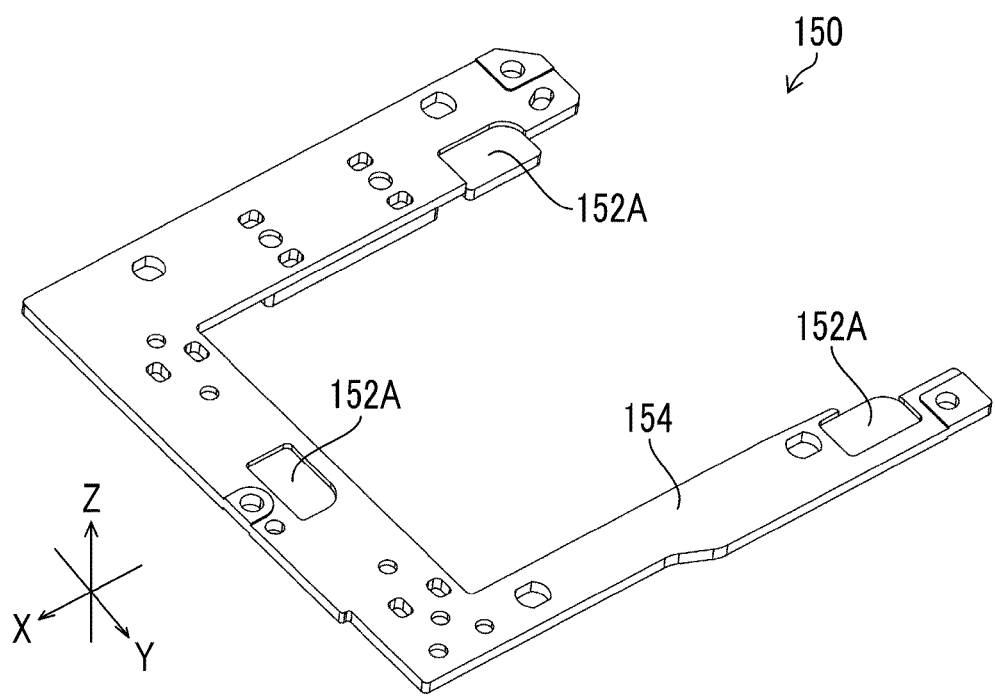
FIG. 5 is a perspective view showing a state in which the drive yoke is viewed from a subject side (+Z side).

FIG. 5 is a perspective view showing a state in which the drive yoke 150 is viewed from the +Z side (subject side). As shown in FIG. 5, in a case where a portion of the first ball receiving surface 152 is viewed from the +Z side, it can be seen that a recessed portion 152A (recessed portion) is formed. As will be described in detail later, the shake correction device 100 is attached to the imaging apparatus main body 2 via a mounting surface 154 (mounting surface) which is a surface on a side opposite to the first ball receiving surface 152.

Material of Drive Yoke (First Yoke)

The drive yoke 150 (first yoke) described above is formed of a material having a saturation magnetic flux density of 0.6 T or more and a surface hardness of 290 Hv or more. As such a material, for example, a SUS630 material and a SUS631 material can be used. These materials are precipitation hardening stainless steels, which are magnetic materials having a relatively high saturation magnetic flux density (about 0.6 T to 0.9 T), and can satisfy performance required for the saturation magnetic flux density and the surface hardness. Although there are a plurality of materials having different characteristics for the SUS630 material and the SUS631 material, it is preferable that the drive yoke 150 (first yoke) is formed of a material having a surface hardness of 350 Hv or more among those materials.

Figure 6:
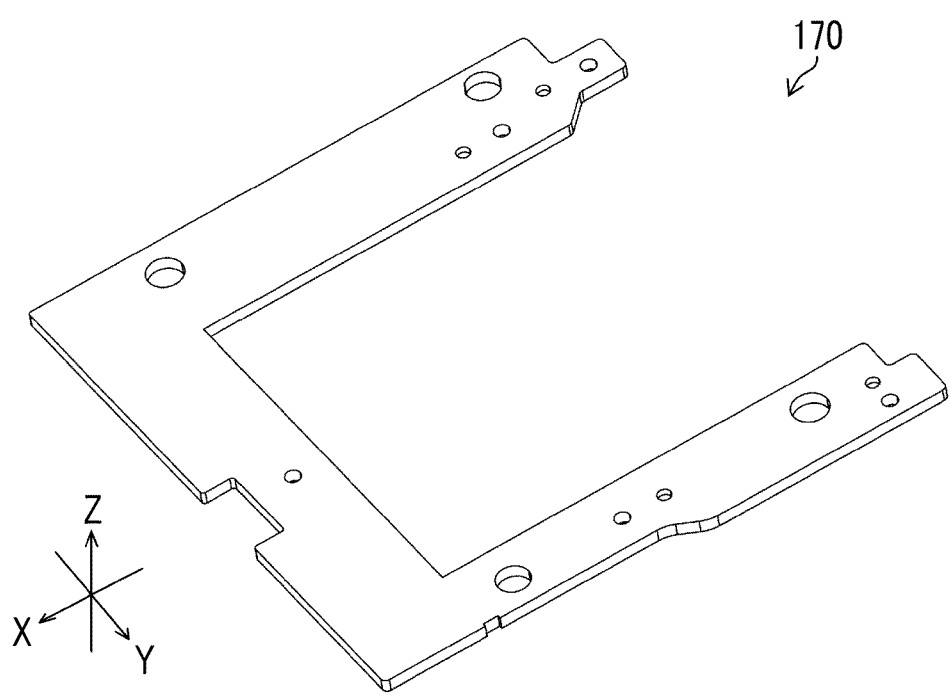
FIG. 6 is a perspective view showing a state in which a counter yoke is viewed from the subject side (+Z side).

FIG. 6 is a view showing a state in which the counter yoke 170 is viewed from the subject side (+Z side).

Configuration of Movable Unit

Figure 7:
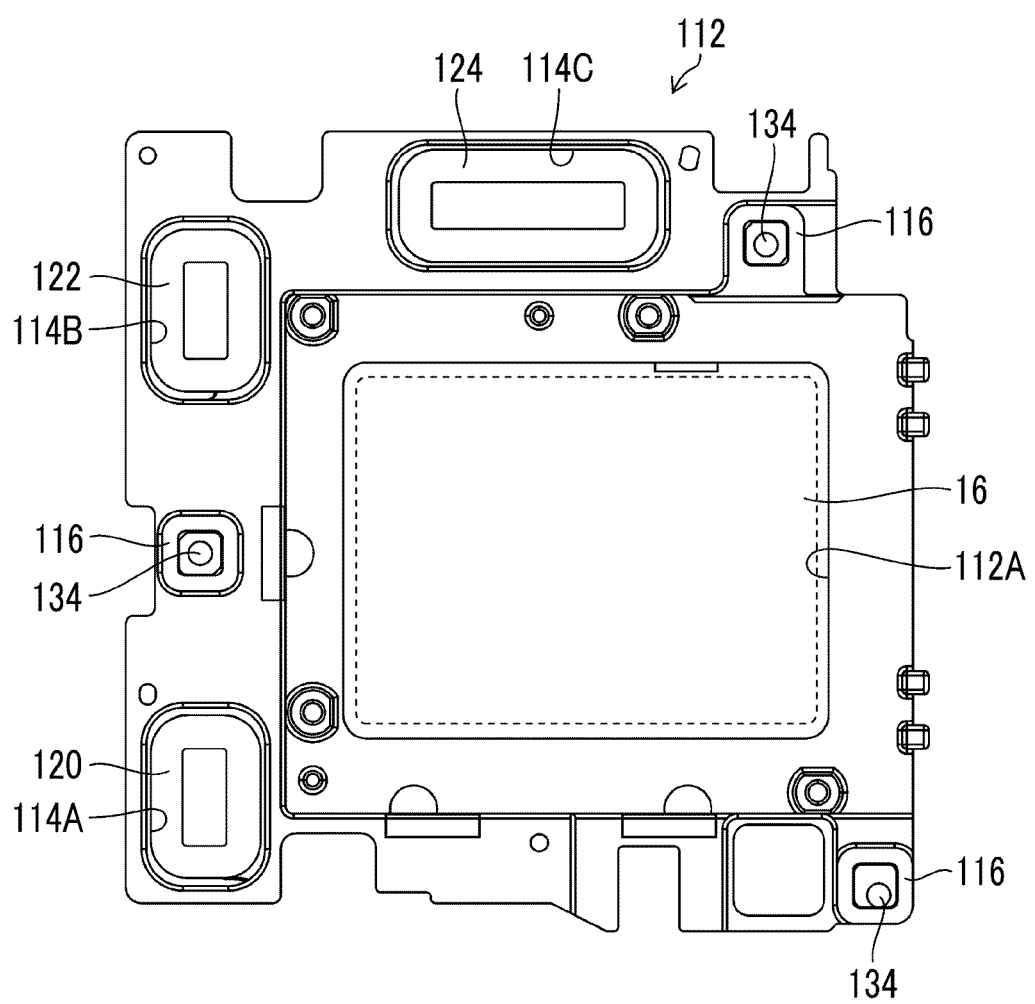
FIG. 7 is a front view showing a holding frame of a movable unit.

FIG. 7 is a front view showing the holding frame 112 (holding frame) of the movable unit 110. The holding frame 112 includes an opening 112A, and the imaging element 16 (not shown in FIG. 7) is disposed in the opening 112A. Further, the holding frame 112 includes openings 114A, 114B, and 114C, and coils 120, 122, and 124 (coil members) are disposed in the openings, respectively. Further, in the holding frame 112, ball holding portions 116 (ball holding portions) that hold the balls 134 are formed at three locations. The ball holding portions 116 are formed at positions corresponding to the first ball receiving surfaces 152 described above.

State in which Ball is Received on First Ball Receiving Surface

Figure 8:
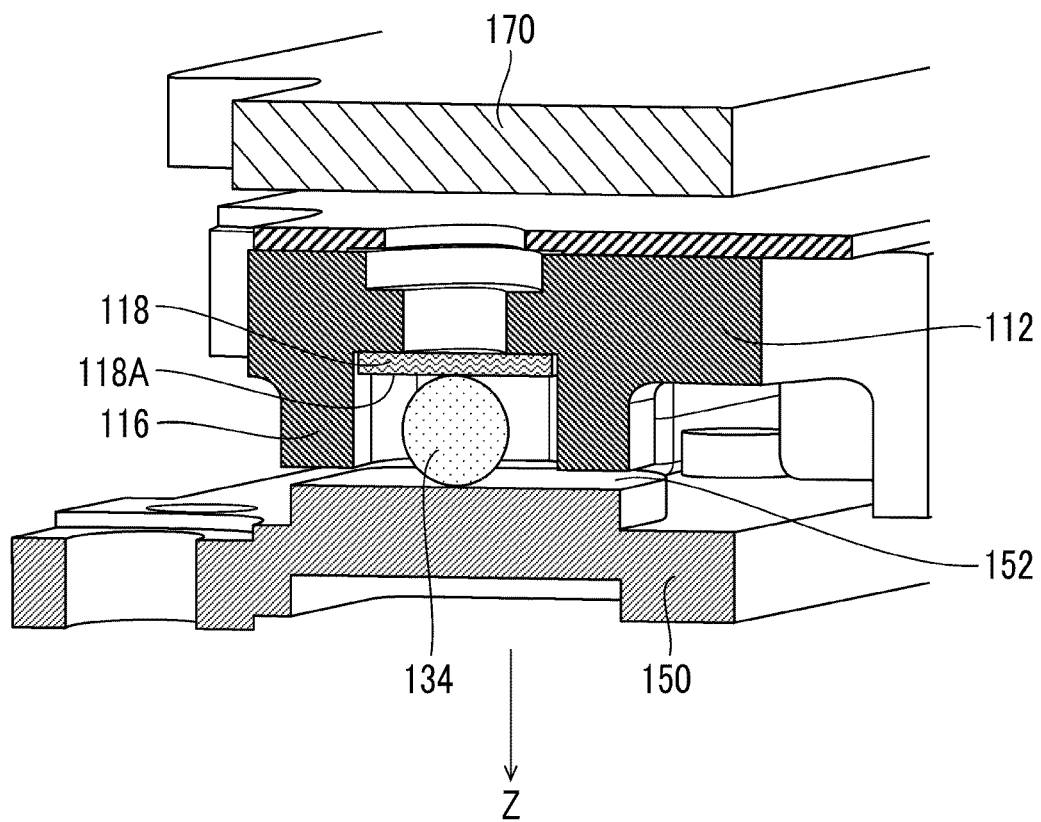
FIG. 8 is a view showing a state in which a ball is received on a first ball receiving surface.

FIG. 8 is a view (partial cross-sectional view) showing a state in which the ball 134 is received on the first ball receiving surface 152. A ball receiving member 118 is disposed in the ball holding portion 116, and a surface of the ball receiving member 118 on the +Z side is in contact with the ball 134 as a second ball receiving surface 118A (second ball receiving surface). In a state in which the shake correction device 100 is assembled, the ball 134 held by the ball holding portion 116 is in contact with the first ball receiving surface 152, and the ball 134 rolls on the first ball receiving surface 152 as the movable unit 110 moves. In a case where biasing is unbalanced or the like, it is acceptable for a part of the three balls 134 to float from the first ball receiving surface 152.

Effect Exhibited by Selection of Material and Integration of Components

In order to allow the movable unit 110 to move in translation or to rotate without falling with respect to a plane (vertical plane) intersecting the optical axis L, the first ball receiving surface 152 is required to have a high flatness. Therefore, there is a demand for high-accuracy assembly in which a high flatness is ensured in the fixed unit 130 in which the first ball receiving surface 152 and the yokes (drive yoke 150 and counter yokes 170) are assembled. In the related art, the ball receiving surface and the yoke are joined to each other by a strong instant adhesive, spot welding, or the like.

Assembling with an adhesive is a complicated process such as bonding an adhering surface to the yoke and a side surface of the yoke together while handling components to avoid scratches and dents on the ball receiving surface, and is a high-cost process in which it is difficult to control an assembly quality, because the ball receiving surface is tilted in a case where an adhesive thickness applied to the adhering surface is not uniform, and the followability of the movable unit deteriorates in a case where the adhesive adheres to the ball receiving surface. Assembling by spot welding is a process that requires dedicated equipment and welding knowledge, and is also a high-cost process in which it is difficult to control an assembly quality, because the ball receiving surface is distorted or peeled off in a case where welding conditions are not appropriate.

As described in the present embodiment, in the component in which the yoke and the ball receiving surface are integrated using a material having a high saturation magnetic flux density and a high surface hardness, such as a SUS630 material or a SUS631 material, such joining processes are unnecessary. As a result, cost reduction can be expected in terms of assembly man-hours, equipment, and quality control. In addition, in a case where machining such as half punching is performed on the integrated component, a high flatness can be realized by forming the ball receiving surface having a protruding shape such that warping or distortion is small, and shake correction with high accuracy is achieved.

In a case of designing a VCM of a BIS in a lens-interchangeable camera, it is assumed that a user uses the VCM in combination with various lenses, and the VCM that will work even with a lens with the strictest performance requirements is designed. Therefore, the BIS has a large movable amount. The maximum thrust force of the VCM is obtained in a case where the movable unit is at the center, and the thrust force decreases as the movable unit moves away from the center. It was inevitable to use a yoke made of a SPCC material in a VCM design for generating a necessary and sufficient thrust force in the vicinity of a movable region end portion of the BIS having a large movable amount. Meanwhile, in a case of designing a VCM of a BIS in a lens-integrated camera, since a combination of a lens and a body is determined on a one-to-one basis, the VCM can be individually optimized in accordance with the performance of the lens. This means that the BIS has a movable amount suppressed to the necessary minimum and that it is possible to perform a VCM design that satisfies the required performance by using a yoke of the SUS630/631 material instead of a yoke of the SPCC material.

Attachment and Biasing of Shake Correction Device

Figure 9:
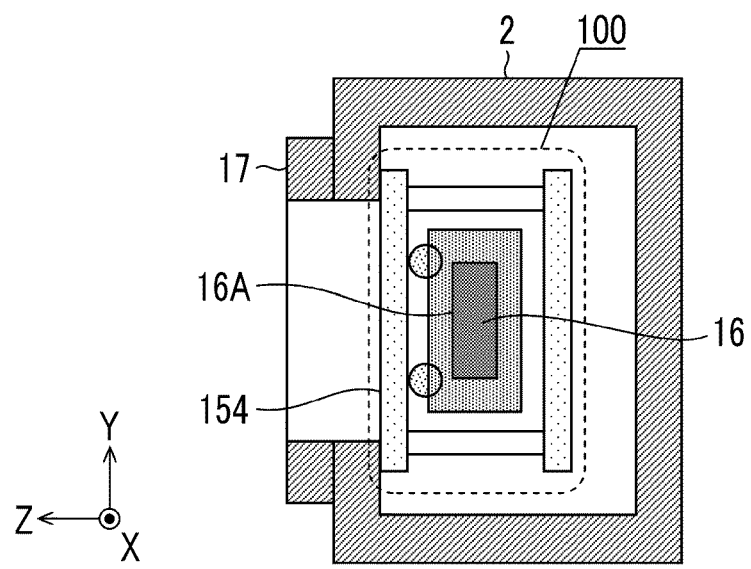
FIG. 9 is a schematic view showing a state in which the shake correction device is attached to an imaging apparatus main body.

FIG. 9 is a schematic view showing a state in which the shake correction device 100 is attached to the imaging apparatus main body 2. The mounting surface 154 (mounting surface) is a surface (surface on the subject side; surface on the +Z side) on a side opposite to the first ball receiving surface 152 of the integrated component (drive yoke 150; first yoke) and is a reference surface for fastening the shake correction device 100 to the imaging apparatus main body 2. The lens device 12 is attached to the imaging apparatus main body 2 via a mount surface 17.

Relationship Between Whether or not to Interchange Lens and Biasing Direction of Movable Unit A lens-interchangeable camera has a mount structure in which a lens can be attached and detached, and a user can clean the imaging element from the mount. In this case, the imaging element is touched in a case of performing cleaning using cleaning paper or the like. Even in a camera equipped with a shake correction mechanism (BIS), in a case of a BIS configuration in which a pressing direction of paper and a biasing direction of the movable unit are the same direction, there is no rattling in an optical axis direction even in a case where the imaging element is touched, and the quality is not impaired.

Figure 14:
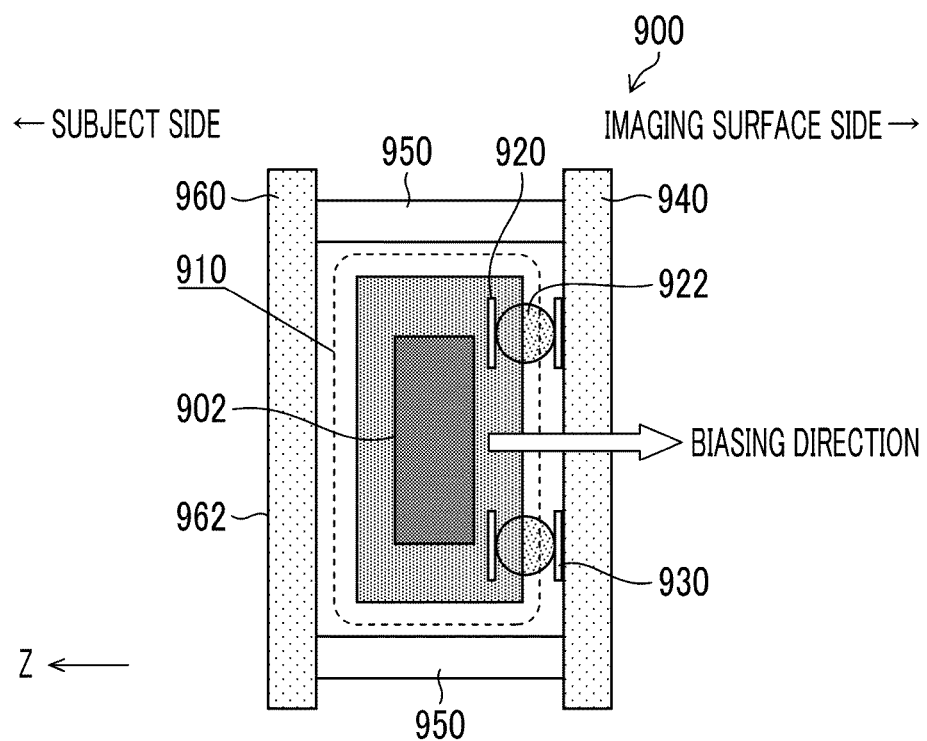
FIG. 14 is a schematic view showing a configuration of a shake correction device in the related art.

Meanwhile, in a case where the pressing direction of the paper and the biasing direction of the movable unit are opposite to each other, there is rattling in the optical axis direction in a case where the imaging element is touched and the quality may impaired. For this reason, in the related art, the BIS is configured such that the pressing direction of the paper and the biasing direction of the movable unit are the same direction. FIG. 14 is a schematic view showing a configuration of such a shake correction device in the related art. As shown in FIG. 14, in a shake correction device 900 in the related art, both the pressing direction of the paper and the biasing direction of the movable unit are a −Z direction (imaging surface side; imager side) and are the same direction.

Figure 10:
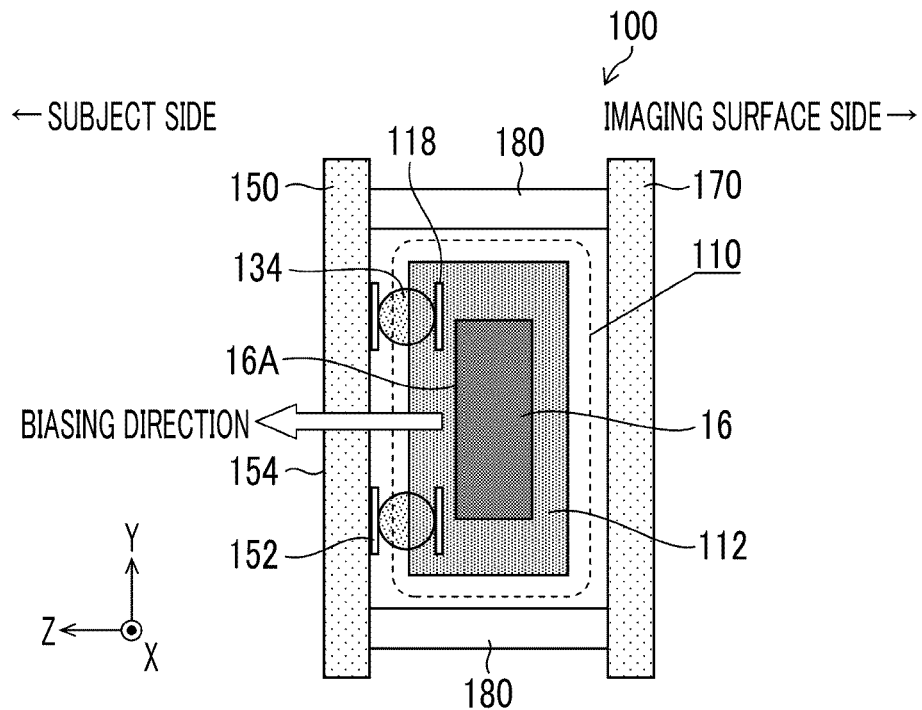
FIG. 10 is a schematic view showing a biasing direction of the shake correction device.

In contrast to such a lens-interchangeable camera, a lens-integrated camera has a structure that a user cannot directly access the imaging element. Accordingly, there is no problem even in a case where the biasing direction of the movable unit is reversed to the +Z side (subject side), and furthermore, it is possible to achieve a reduction in cost due to a simple BIS configuration. The present embodiment is effective in a shake correction device having such a configuration and a camera (particularly, a lens-integrated camera) comprising such a shake correction device. FIG. 10 is a schematic view showing a biasing direction in the shake correction device 100 according to the present embodiment. As shown in FIG. 10, in the shake correction device 100, the biasing direction of the movable unit is a +Z direction (subject side).

Biasing Performed by Biasing Member

Figure 11:
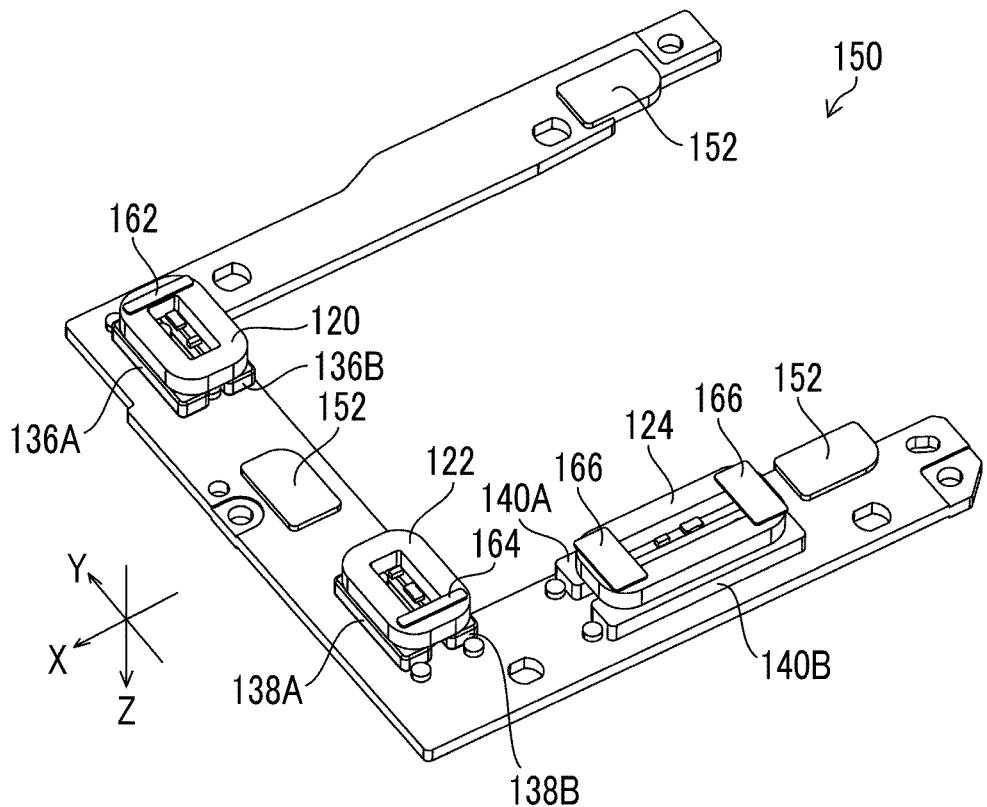
FIG. 11 is a view showing a state of biasing performed by a biasing member.

FIG. 11 is a view showing a state of biasing performed by the biasing member. As shown in FIG. 11 and as described above with reference to FIG. 4, the magnets 136A, 136B, 138A, 138B, 140A, and 140B are disposed on the drive yoke 150 (first yoke), and the coils 120, 122, and 124 are disposed on the −Z sides of these magnets, respectively. Further, the magnetic springs 162, 164, and 166 (biasing members) are disposed on the −Z side of those coils, respectively. The magnetic springs 162, 164, and 166 are composed of a metal plate of a magnetic material. As described above, the magnet of the fixed unit 130 and the magnetic spring of the movable unit 110 overlap with each other in the optical axis direction (Z direction), and a magnetic attraction force acts between the magnet and the magnetic spring. As a result, the movable unit 110 (including the imaging element 16 and the coils 120, 122, and 124 held by the holding frame 112) is biased to the drive yoke 150 (first yoke) of the fixed unit 130. The magnetic springs 162, 164, and 166 are one aspect of biasing members, and other biasing members, such as mechanical springs, may be used. In addition, the number and positions of the magnetic springs (biasing members) are not limited to the aspect of FIG. 11.

Number of Components and Unlikelihood of Falling of Shake Correction Device

The mounting surface 154 (mounting surface), which is a surface on a side opposite to the first ball receiving surface 152 formed integrally with the drive yoke 150 (first yoke), is a reference surface for attaching the shake correction device 100 to the imaging apparatus main body 2. The mount surface 17 for attaching the lens device 12 is present on the imaging apparatus main body 2 (see FIG. 9), and it is required to attach the shake correction device 100 such that the imaging surface 16A of the imaging element 16 is parallel to the mount surface 17. In a case where the number of components interposed between the imaging element 16 and the mounting surface is large, component tolerances are accumulated by the number of the components. That is, the mounting surface 154 is likely to fall (likely to be inclined) with respect to the imaging element 16, and it is difficult to make the mounting surface 154 parallel to the imaging element 16.

In the shake correction device of the lens-interchangeable camera in the related art, a movable unit 910 is biased to a fixed unit (base yoke 940) on the imaging surface side (−Z side) as described above with reference to FIG. 14. In the shake correction device 900 having such a configuration, a ball receiving surface 920 of a movable unit, a ball 922, a ball receiving surface 930 of a fixed unit, a base yoke 940, a shaft 950, and a front yoke 960 are interposed between the imaging element and the imaging apparatus main body.

In contrast, in the shake correction device 100 according to the present embodiment, the movable unit 110 is biased to the fixed unit (drive yoke 150) on the subject side (+Z side) as described above with reference to FIG. 10 and the like. In the shake correction device 100 having such a configuration, the second ball receiving surface 118A of the movable unit 110, the ball 134, and the drive yoke 150 (first yoke) are interposed between the imaging element 16 and the imaging apparatus main body 2. Further, in the shake correction device 100 (movable unit 110), the counter yoke 170 is attached to the drive yoke 150 via a shaft 180. However, in the sense of "falling of the mounting surface 154 with respect to the imaging element 16", the shaft 180 and the counter yoke 170 are not interposed.

In such a shake correction device 100, since the number of components interposed between the imaging element 16 and the mounting surface 154 is smaller than that in the shake correction device 900 in the related art, the shake correction device 100 is configured to be less likely to fall.

Accordingly, it is possible to eliminate a tilt adjustment process for making the imaging element 16 parallel to the mount surface 17 or to reduce adjustment man-hours, so that cost reduction is achieved.

Disposition of Optical Member

Figure 12A:
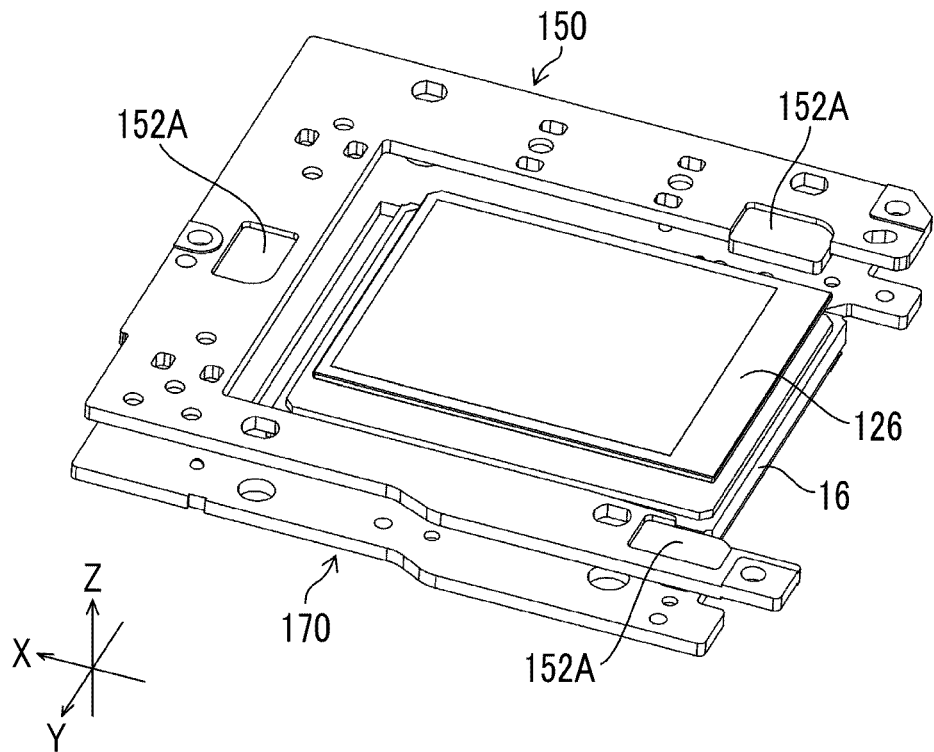
FIGS. 12A and 12B are views showing a state in which an optical member is disposed in front of an imaging surface.
Figure 12B:
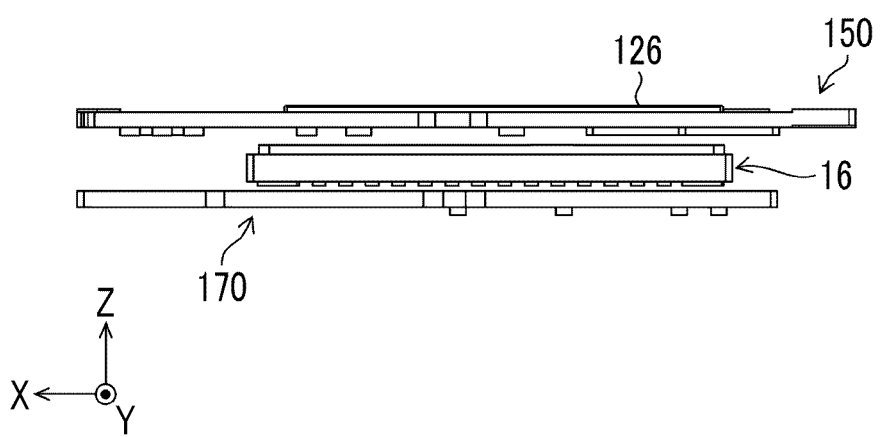

In the present embodiment, the movable unit 110 comprises an optical member disposed in a direction (+Z side) toward the drive yoke 150 (first yoke) from the imaging surface 16A of the imaging element 16. FIGS. 12A and 12B are views showing a state in which an optical member 126 is disposed in front of the imaging surface. FIG. 12A is a front perspective view (a state seen from a +Z side) of the movable unit 110, and FIG. 12B is a side view (a state seen from a +Y side). The optical member 126 is an optical member for cutting infrared light (IR), and a glass provided with an IR cut coating, an IR cut filter, or the like can be used. However, other optical members such as a polarizer or a color filter may be used instead of or in addition to such an optical member for cutting IR.

Figure 13:
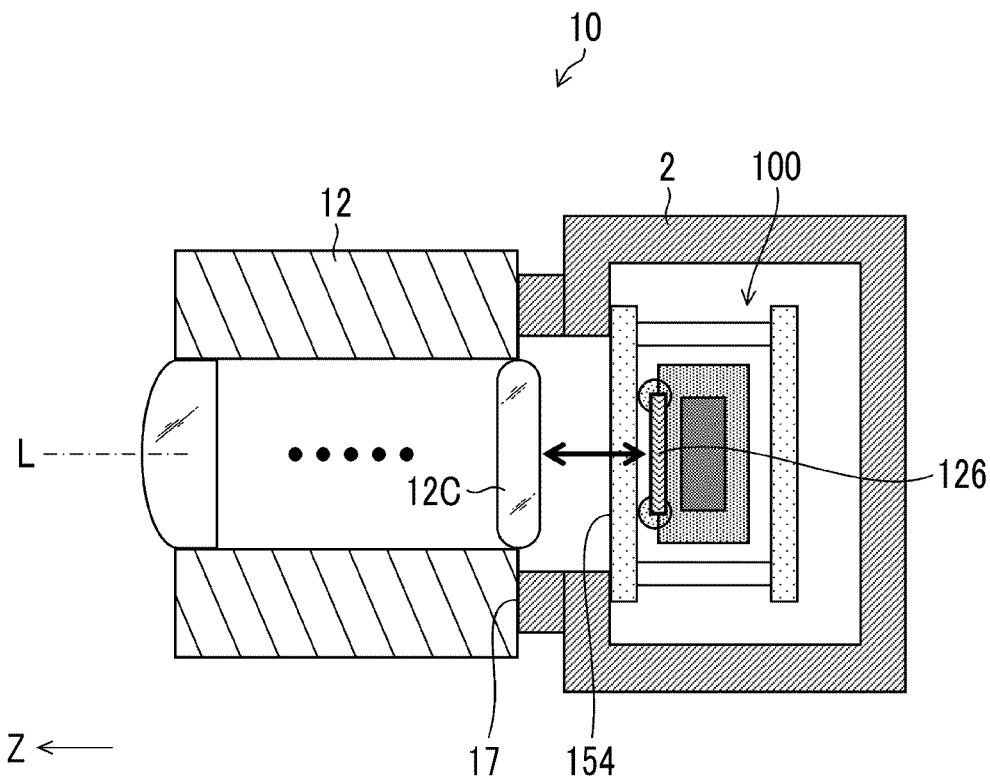
FIG. 13 is a schematic view showing a positional relationship between a rearmost lens and the optical member.

Influence of Configuration of Shake Correction Device on Configuration of Imaging Apparatus FIG. 13 is a schematic view showing a positional relationship between the rearmost lens and the optical member. In a case where the imaging apparatus 10 is of a lens-integrated type, in the shake correction device 100, a distance between the optical member 126 disposed in front (+Z side) of the imaging element 16 and a lens rearmost surface (surface on the −Z side of a rearmost lens 12C) can be designed to be short. This is because, in a case where the biasing direction of the movable unit 110 is to the imaging surface side (imager side; −Z side), there is a concern that the rearmost lens 12C and an optical member 126 may come into contact with each other in a case where an external force such as drop or vibration is applied in a direction opposite to the biasing direction so that the movable unit 110 floats to the (+Z side), but in a case where the biasing direction of the movable unit 110 is to the subject side (+Z side), a direction in which the movable unit 110 floats by the external force is reversed (to the −Z side), so that the optical member 126 moves away from the rearmost lens 12C, and the movable unit 110 does not come into contact with the rearmost lens 12C. It is assumed that other optical components are not interposed between the optical member 126 and the rearmost lens 12C in the direction of the optical axis L.

As described above, in the shake correction device 100 of the present embodiment, by employing the above-described configuration, restrictions on the optical design in the imaging apparatus 10 are reduced, and it is possible to design a more compact and high-performance lens.

Hereinbefore, the embodiments of the present invention have been described above, but the present invention is not limited to the above-described aspects, and various modifications can be made.

EXPLANATION OF REFERENCES

1: subject
2: imaging apparatus main body
4: eyepiece portion
10: imaging apparatus
12: lens device
12A: lens group
12B: lens group
12C: rearmost lens
16: imaging element
16A: imaging surface
17: mount surface
22: image input controller
24: image processing unit
26: compression/expansion processing unit
28: video encoder
30: image monitor
38: operation unit
40: controller
47: flash memory
48: memory
52: media controller
54: memory card
58: driving unit
66: sensor
100: shake correction device
110: movable unit
112: holding frame
112A: opening
114A: opening
114B: opening
114C: opening
116: ball holding portion
118: ball receiving member
118A: second ball receiving surface
120: coil
122: coil
124: coil
126: optical member
130: fixed unit
134: ball
136A: magnet
136B: magnet
138A: magnet
138B: magnet
140A: magnet
140B: magnet
150: drive yoke
152: first ball receiving surface
152A: recessed portion
154: mounting surface
162: magnetic spring
164: magnetic spring
166: magnetic spring
170: counter yoke
180: shaft
900: shake correction device
910: movable unit
920: ball receiving surface
922: ball
930: ball receiving surface
940: base yoke
950: shaft
960: front yoke

What is claimed is:

1. A shake correction device comprising:
    an imaging element;
    a fixed unit that includes a magnet member and a yoke member;
    a movable unit that includes a holding frame holding the imaging element and a coil member, in which the holding frame is supported to be movable within a plane intersecting an optical axis of the imaging element; and
    a ball that is disposed between the fixed unit and the movable unit,
    wherein the yoke member includes a first yoke to which the magnet member is provided and a second yoke that is disposed to be spaced apart from the first yoke, the first yoke has a first ball receiving surface that is in contact with the ball, and the first ball receiving surface is a partial region of the first yoke and is a protruding portion toward a movable unit side.

2. The shake correction device according to claim 1, wherein the first ball receiving surface is a surface formed by machining the protruding portion.

3. The shake correction device according to claim 1, wherein the protruding portion is a protruding portion formed by press-working a member constituting the first yoke.

4. The shake correction device according to claim 1, wherein the first yoke is disposed on a subject side with respect to the imaging element, and the movable unit is biased to the first yoke.

5. The shake correction device according to claim 4, further comprising:

a biasing member that biases the movable unit to a first yoke side.

6. The shake correction device according to claim 1, wherein the first yoke is formed of a material having a saturation magnetic flux density of 0.6 T or more and a surface hardness of 290 Hv or more.

7. The shake correction device according to claim 6, wherein the first yoke is formed of a material having a surface hardness of 350 Hv or more.

8. The shake correction device according to claim 1, wherein a ball holding portion that holds the ball is formed in the movable unit, and the ball held by the ball holding portion rolls on the first ball receiving surface.

9. An imaging apparatus comprising:

the shake correction device according to claim 1; and an optical system that forms an optical image of a subject on the imaging element, wherein the movable unit corrects an image shake by moving within a plane intersecting an optical axis of the imaging element.

10. The imaging apparatus according to claim 9, wherein a surface of the first yoke on a subject side is a mounting surface, and the shake correction device is attached to a main body of the imaging apparatus via the mounting surface.

11. The imaging apparatus according to claim 10, wherein the imaging element and the main body are in contact with each other via the movable unit, a second ball receiving surface formed on the movable unit, the ball, and the first yoke.

12. The imaging apparatus according to claim 9, wherein the movable unit includes an optical member disposed in a direction from an imaging surface of the imaging element toward the first yoke, and the optical member moves away from a rearmost lens in a case where an external force is applied in a direction opposite to a direction in which the movable unit is biased.

13. The imaging apparatus according to claim 12, wherein other optical components are not interposed between the optical member and the rearmost lens in a direction of the optical axis.

14. The imaging apparatus according to claim 9, wherein the imaging apparatus is a lens-integrated imaging apparatus.

\* \* \* \* \*